(12) United States Patent
Yagi et al.

(10) Patent No.: US 11,378,276 B2
(45) Date of Patent: Jul. 5, 2022

(54) COMBUSTOR AND GAS TURBINE

(71) Applicant: Mitsubishi Heavy Industries, Ltd., Tokyo (JP)

(72) Inventors: Nobuo Yagi, Yokohama (JP); Satoshi Dodo, Yokohama (JP); Mitsuhiro Karishuku, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 127 days.

(21) Appl. No.: 16/686,678

(22) Filed: Nov. 18, 2019

(65) Prior Publication Data

US 2020/0158020 A1    May 21, 2020

(30) Foreign Application Priority Data

Nov. 20, 2018  (JP) .............................. JP2018-217340

(51) Int. Cl.
*F23R 3/34* (2006.01)
*F23R 3/28* (2006.01)
(Continued)

(52) U.S. Cl.
CPC ................ *F23R 3/286* (2013.01); *F23R 3/28* (2013.01); *F23R 3/346* (2013.01); *F02C 7/222* (2013.01); *F23R 3/14* (2013.01); *F23R 3/18* (2013.01)

(58) Field of Classification Search
None
See application file for complete search history.

(56) References Cited

U.S. PATENT DOCUMENTS

| 4,100,733 A | 7/1978 | Striebel et al. |
| 9,121,612 B2 | 9/2015 | Uhm et al. |

(Continued)

FOREIGN PATENT DOCUMENTS

| CN | 103672965 A | 3/2014 |
| CN | 104566464 A | 4/2015 |

(Continued)

OTHER PUBLICATIONS

Chinese language Office Action issued in Chinese Application No. 201911126340.8 dated Dec. 14, 2020 (seven (7) pages).

(Continued)

*Primary Examiner* — Katheryn A Malatek
*Assistant Examiner* — Alyson Joan Harrington
(74) *Attorney, Agent, or Firm* — Crowell & Moring LLP

(57) ABSTRACT

To achieve a reduction in waste heat loss of a fuel with improved efficiency in arrangement of a plurality of cavities, or manifold spaces. A multi-stage combustor includes a combustor liner configured to define a combustion chamber therein, a plurality of fuel nozzles configured to inject a fuel, and a manifold configured to distribute the fuel to the plurality of fuel nozzles. The manifold is disposed on a central axis of the combustor liner in a central axis extending direction. The manifold includes a casing and a plurality of partitions inserted in the casing so as to be arranged in a central axis direction of the combustor liner to define a plurality of cavities divided by the partitions. The plurality of cavities are layered in the central axis direction of the combustor liner inside of the casing, and are connected to the corresponding fuel nozzles.

12 Claims, 5 Drawing Sheets

(51) Int. Cl.
*F02C 7/22* (2006.01)
*F23R 3/14* (2006.01)
*F23R 3/18* (2006.01)

(56) References Cited

U.S. PATENT DOCUMENTS

| | | |
|---|---|---|
| 2006/0005542 A1 | 1/2006 | Campbell et al. |
| 2012/0180487 A1* | 7/2012 | Uhm ................ F23D 14/62 60/737 |
| 2013/0029277 A1 | 1/2013 | Koizumi et al. |
| 2013/0074510 A1 | 3/2013 | Berry |
| 2013/0213051 A1* | 8/2013 | Westmoreland, III .. F23R 3/286 60/775 |
| 2013/0318975 A1* | 12/2013 | Stoia ................ F23R 3/283 60/737 |
| 2014/0083102 A1 | 3/2014 | Miura et al. |
| 2015/0113998 A1 | 4/2015 | Tatsumi et al. |
| 2016/0290646 A1 | 10/2016 | Abe et al. |
| 2016/0290650 A1 | 10/2016 | Abd El-Nabi et al. |
| 2017/0276360 A1 | 9/2017 | Berry et al. |
| 2018/0298918 A1 | 10/2018 | Terauchi et al. |
| 2019/0032919 A1 | 1/2019 | Okada et al. |

FOREIGN PATENT DOCUMENTS

| | | |
|---|---|---|
| CN | 105074339 A | 11/2015 |
| CN | 108474559 A | 8/2018 |
| CN | 108758693 A | 11/2018 |
| CN | 108779920 A | 11/2018 |
| JP | 7-71725 A | 3/1995 |
| JP | 8-135910 A | 5/1996 |
| JP | 2013-170813 A | 9/2013 |
| JP | 2016-194405 A | 11/2016 |
| JP | 2017-187186 A | 10/2017 |
| WO | WO 95/11409 | 4/1995 |

OTHER PUBLICATIONS

German-language Office Action issued in German Application No. 10 2019 217 830.8 dated Mar. 17, 2021 with English translation (13 pages).

Japanese Office Action issued in Japanese Application No. 2018-217340 dated Mar. 15, 2022 with English translation (nine (9) pages).

* cited by examiner

COMBUSTOR AND GAS TURBINE

BACKGROUND OF THE INVENTION

1. Field of the Invention

The present invention relates to a multi-stage combustor including a plurality of cavities, or manifold spaces, and a gas turbine including the same.

2. Description of the Related Art

A multi-stage combustor including a premix combustion burner is sometimes adopted for a low NOx-type gas turbine. In such a multi-stage combustor, fuel pipes for supplying a fuel to premix combustion-use nozzles, at which the fuel is ignited sequentially, are connected to a fuel header through corresponding cavities, or manifold spaces, see JP-1996-135910-A and the like.

SUMMARY OF THE INVENTION

When a multi-stage combustion type is adopted, a cavity is required for each of fuel lines, and a fuel pipe for connecting each cavity to corresponding fuel nozzles, pipes branching off from the fuel header to the respective cavities, and so on are required, resulting in a tendency for the fuel lines to become larger and complicated. In addition, pipe paths are lengthened to increase a waste heat loss of a fuel.

An object of the present invention is to provide a multi-stage combustor capable of achieving a reduction in waste heat loss of a fuel with improved efficiency in arrangement of a plurality of cavities, or manifold spaces, and a gas turbine including the same.

To attain the object mentioned above, a multi-stage combustor according to an embodiment of the present invention includes: a combustor liner configured to define a combustion chamber therein; a plurality of fuel nozzles configured to inject a fuel into the combustion chamber; and a manifold configured to distribute the fuel to the plurality of fuel nozzles. The manifold is disposed on a central axis of the combustor liner. The manifold includes a casing, and a plurality of partitions inserted in the casing so as to be arranged in a direction of the central axis of the combustor liner to define a plurality of cavities divided by the partitions. The plurality of cavities are layered in the direction of the central axis of the combustor liner inside of the casing, and are connected to the corresponding fuel nozzles.

The above embodiment of the present invention is able to achieve a reduction in waste heat loss of the fuel with improved efficiency in arrangement of the plurality of cavities.

DESCRIPTION OF THE PREFERRED EMBODIMENTS

Hereinafter, embodiments of the present invention will be described with reference to the accompanying drawings.

First Embodiment

—Gas Turbine—

Figure 1:
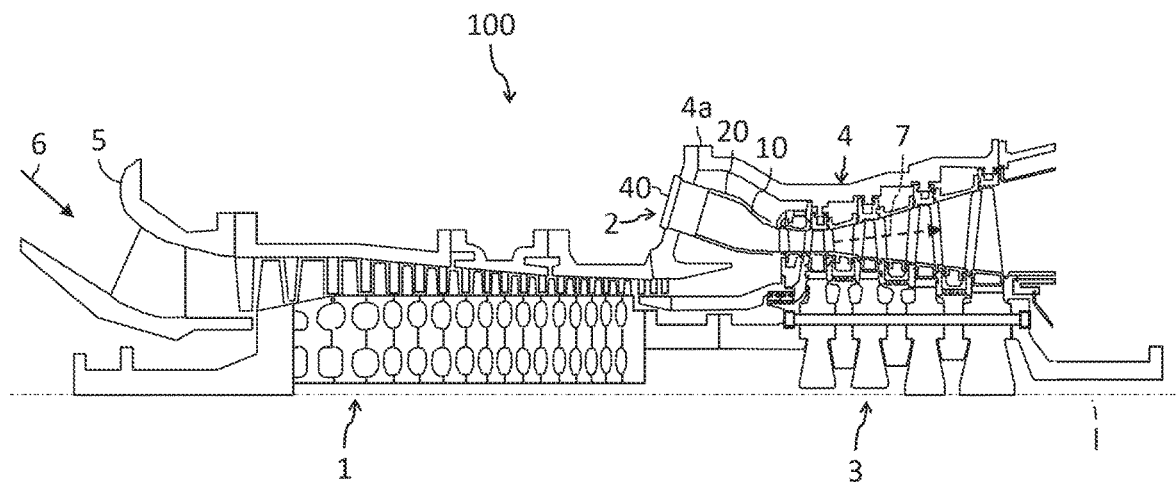
FIG. 1 is a diagram illustrating one example structure of a gas turbine including a combustor according to a first embodiment of the present invention.

FIG. 1 is a diagram illustrating one example structure of a gas turbine 100 including a combustor 2 according to a first embodiment of the present invention. While the gas turbine 100 illustrated in FIG. 1 is a single-shaft gas turbine, an embodiment of the present invention is also applicable to a so-called twin-shaft gas turbine.

The gas turbine 100 illustrated in FIG. 1 includes a compressor 1, the combustor 2, and a turbine 3. The compressor 1 and the turbine 3 are coupled to each other through a shaft which is not depicted. The compressor 1 is driven to rotate by the turbine 3, and compresses an air 6 sucked in through an air inlet portion 5 to generate a high-pressure compressed air, and supplies the high-pressure compressed air to the combustor 2. The combustor 2 burns a fuel mixed with the compressed air supplied from the compressor 1 to generate a high-temperature combustion gas 7, and supplies the high-temperature combustion gas 7 to the turbine 3. The turbine 3 is driven by the combustion gas 7 supplied from the combustor 2. Load equipment, not depicted, such as a generator or a pump, is coupled to the turbine 3 or the compressor 1. When the generator as the load equipment is coupled to the turbine 3, rotational power of the turbine 3 minus power that is used to drive the compressor 1 is converted to electric power in the generator. The combustion gas 7, having driven the turbine 3, is discharged to the atmosphere as turbine exhaust.

—Combustor—

Figure 2:
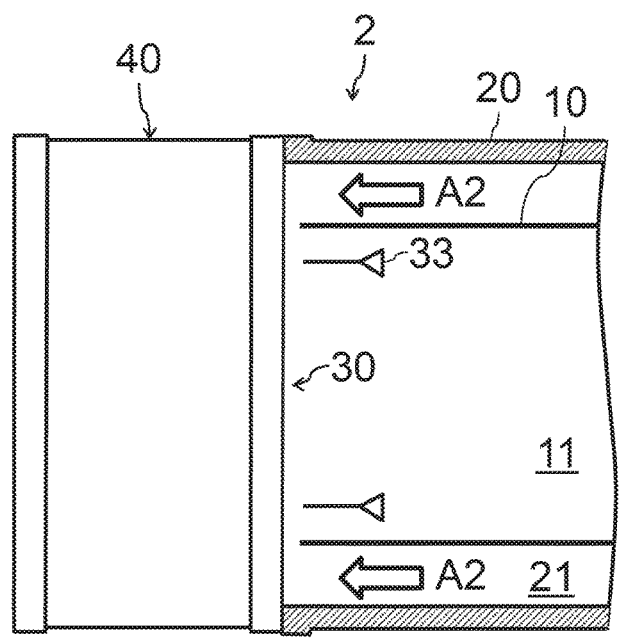
FIG. 2 is a partial sectional view illustrating one example structure of the combustor provided in the gas turbine including the combustor according to the first embodiment of the present invention.
Figure 3:
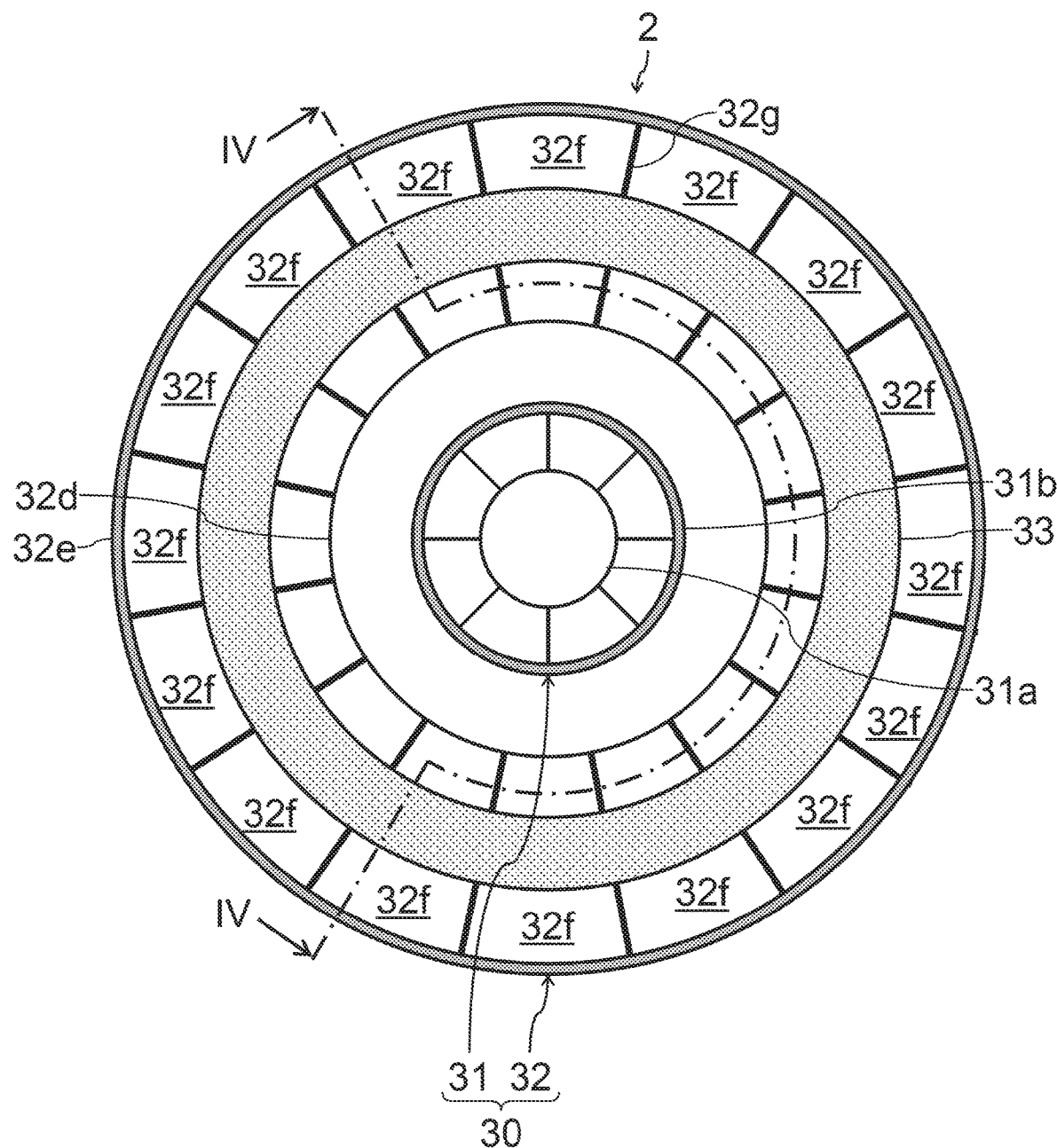
FIG. 3 is a diagram illustrating the combustor illustrated in FIG. 2 as viewed from a side on which a combustion chamber lies.

FIG. 2 is a partial sectional view illustrating one example structure of the combustor 2 provided in the gas turbine 100 including the combustor 2 according to an embodiment of the present invention. FIG. 3 is a diagram illustrating the combustor 2 illustrated in FIG. 2 as viewed from a side on which a combustion chamber lies.

The combustor 2 is of a multi-stage combustion type, is inserted in a casing 4 of the gas turbine 100, see FIG. 1, and includes a combustor liner 10, an outer cylinder 20, a burner 30, and a manifold 40.

The combustor liner 10 is a cylindrical member configured to define a combustion chamber 11 therein, and is positioned on a downstream side, a right side in FIG. 2, of the burner 30 in a fuel injection direction. An inside space defined by the combustor liner 10 is the combustion chamber 11, and the fuel supplied from the burner 30 is mixed with the air in the combustion chamber 11 and is then burned to generate the combustion gas 7.

The outer cylinder 20 of the combustor 2 covers an outer circumference of the combustor liner 10, and an annular space defined between the outer cylinder 20 and the combustor liner 10 forms an annular flow channel 21 that guides a compressed air A2 from the compressor 1 to an upstream side of the burner 30. The compressed air A2, flowing into the annular flow channel 21, convection-cools the combustor liner 10. In addition, a part of the compressed air A2 that flows in the annular flow channel 21 flows into the combustor liner 10 through a large number of cooling holes, not depicted, provided in an outer circumferential portion of the combustor liner 10, and is used for film cooling of the combustor liner 10. The rest of the compressed air A2, which has not flown into the cooling holes, is supplied to the burner 30 through the annular flow channel 21. The compressed air A2 that has been supplied to the burner 30 is mixed with a fuel distributed from the manifold 40 and injected from a diffusion combustion-use fuel nozzle 31a, see FIG. 3, or premix combustion-use fuel nozzles 32a, 32b, and 32c, see FIG. 4, and the fuel is burned in the combustion chamber 11 as mentioned above.

—Burner—

The burner 30 includes a diffusion burner 31 and a premix burner 32. The diffusion burner 31 is a burner of a diffusion combustion type, and includes the fuel nozzle 31a and a swirler 31b. The fuel nozzle 31a is disposed on a central axis of the combustor 2 in a central axis extending direction, includes a fuel injection hole at a tip, which is a right end in FIG. 1, and directly injects the fuel into the combustion chamber 11, in a rightward direction in FIG. 1, through the fuel injection hole. The swirler 31b is disposed so as to surround an outer circumference of the tip of the fuel nozzle 31a or its vicinity, and injects a swirling air flow to enhance combustion stability of the diffusion burner 31.

Figure 4:
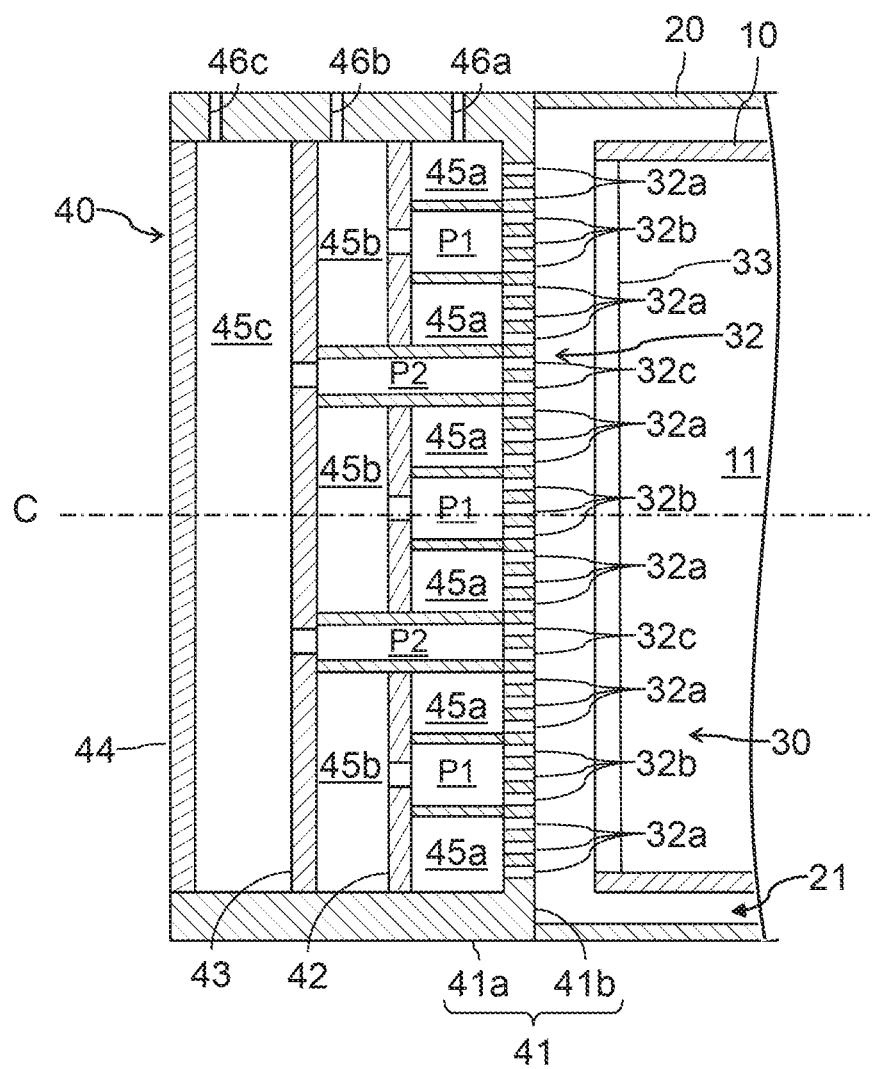
FIG. 4 is a sectional view illustrating the structure of a manifold provided in the combustor according to the first embodiment of the present invention, which is a sectional view taken along line IV-IV in FIG. 3.

The premix burner 32 is a burner of a premix combustion type, and includes an inner cylinder 32d, an outer cylinder 32e, a plurality of partitions, or premixer vanes, 32g, and the plurality of fuel nozzles 32a to 32c, see FIG. 4. The inner cylinder 32d and the outer cylinder 32e are cylindrical members that form a premixer, and the inner cylinder 32d covers an outer circumference of the diffusion burner 31, while the outer cylinder 32e covers an outer circumference of the inner cylinder 32d. A cylindrical space defined between the inner cylinder 32d and the outer cylinder 32e is connected with the annular flow channel 21. The plurality of, sixteen in this example, partitions 32g of the premix burner 32 divide the cylindrical space between the inner cylinder 32d and the outer cylinder 32e into a plurality of, sixteen in this example, premix chambers 32f. Each premix chamber 32f is a space in which the fuel mixes with the air. A ring-shaped flame stabilizer 33 is provided at exits of the premix chambers 32f, that is, on a side of the premix burner 32 on which the combustion chamber 11 lies. The flame stabilizer 33 is a flame stabilizer of a physically stabilizing type disposed as an obstacle in flow channels of a premixed gas to form a circulating flow on the downstream side, i.e., in the combustion chamber 11. The partitions 32g of the premix burner 32 are each formed by a plate in this example, and are arranged in a radial manner when viewed from the combustion chamber 11. More than one, e.g., two or three, of the fuel nozzles 32a is provided for each premix chamber 32f. The fuel injected from each fuel nozzle 32a is mixed with the compressed air A2 in the corresponding premix chamber 32f, and the resulting mixture is ejected into the combustion chamber 11, i.e., rightward in FIG. 1.

—Manifold—

FIG. 4 is a sectional view illustrating the structure of a main part of the combustor 2 according to the first embodiment of the present invention, which is a sectional view taken along line IV-IV in FIG. 3. In FIG. 4, the premixer including the inner cylinder 32d, the outer cylinder 32e, and the partitions 32g is not depicted to avoid complexity in illustration.

The manifold 40 is a component to distribute the fuel to a plurality of fuel nozzles, which includes at least the premix combustion-use fuel nozzles 32a to 32c among the fuel nozzles 31a and 32a to 32c. This manifold 40 is housed in a combustor chamber 4a, see FIG. 1, of the casing 4 of the gas turbine 100 together with the combustor liner 10, the outer cylinder 20 of the combustor 2, and the burner 30, and is disposed on a central axis C of the combustor liner 10 in the central axis extending direction, i.e., the central axis C passes through the manifold 40. The manifold 40 includes a casing 41 and a plurality of, three in the present embodiment, partitions 42, 43, and 44.

The casing 41 is a member that forms an exterior of the manifold 40, and includes a cylindrical outer circumferential face 41a and an end face 41b facing the combustion chamber 11. An end opening of the outer circumferential face 41a on a side on which the combustion chamber 11 lies is closed by the end face 41b. An end of the outer circumferential face 41a on a side opposite to the side on which the combustion chamber 11 lies is open. This casing 41 is, for example, coupled to the outer cylinder 20 of the combustor 2, so that the manifold 40 is disposed on the central axis C of the combustor liner 10 in the central axis extending direction as mentioned above. The premix combustion-use fuel nozzles 32a to 32c are provided in large numbers in the end face 41b of the casing 41. Each of the fuel nozzles 32a to 32c defines a hole provided in the end face 41b in the present embodiment, but may alternatively be formed by a tubular member projecting toward the combustion chamber 11. The end face 41b is formed by an even flat plate, and each of the fuel nozzles 32a to 32c defining a hole open toward the combustion chamber 11 in a direction of the central axis C.

The combustor 2 according to the present embodiment is of the multi-stage combustion type, having a plurality of, three in this example, fuel lines, not depicted, and capable of changing the ignition area of the burner in stages, and the premix combustion-use fuel nozzles 32a are connected to a first fuel line, not depicted. Similarly, the premix combustion-use fuel nozzles 32b are connected to a second fuel line, not depicted, and the premix combustion-use fuel nozzles 32c are connected to a third fuel line, not depicted. A separate fuel line is connected to the diffusion combustion-use fuel nozzle 31a, see FIG. 3.

The fuel nozzles 32a to 32c are arranged in a ring concealed by the flame stabilizer 33 in FIG. 3. In the illustrated example arrangement of the present embodiment, the fuel nozzles 32b and 32c are arranged alternately in a circumferential direction with the fuel nozzles 32a disposed between the fuel nozzles 32b and 32c. Specifically, the layout is such that the fuel nozzles 32a are disposed for one of the premix chambers 32f, the fuel nozzles 32b are disposed for one of the premix chambers 32f adjacent thereto, the fuel nozzles 32a are disposed for the premix chamber 32f adjacent thereto, the fuel nozzles 32c are disposed for the premix chamber 32f adjacent thereto, and so on. More than one, e.g., two or three, of the fuel nozzles 32a, 32b, or 32c is disposed for each of the premix chambers 32f.

The partitions 42 to 44 are members that define a plurality of, or three in this example, annular cavities, or manifold spaces, 45a, 45b, and 45c in the manifold 40, and are inserted in the casing 41 so as to be arranged in the direction of the central axis C of the combustor liner 10. The partitions 42 to 44 are positioned on the central axis C of the combustor liner 10 and arranged while facing one another in the central axis C direction, and the cavities 45a to 45c divided and formed by the partitions 42 to 44 are layered, or superposed one upon another, in the direction of the central axis C inside of the casing 41. Specifically, a space defined by the end face 41b and the partition 42 inside of the outer circumferential face 41a of the casing 41 is the cavity 45a. Similarly, a space defined by the partitions 42 and 43 inside of the outer circumferential face 41a of the casing 41 is the cavity 45b, and a space defined by the partitions 43 and 44 inside of the outer circumferential face 41a of the casing 41 is the cavity 45c. In the illustrated example of the present embodiment, the number of cavities is three, but the number of cavities may be increased or reduced in accordance with the number of partitions.

In addition, the partition 42 is provided with a plurality of, or the same number as that of premix chambers 32f for the second fuel line, fuel passages P1 each in the shape of a straight tube, and the partition 43 is provided with a plurality of, or the same number as that of premix chambers 32f for the third fuel line, fuel passages P2 each in the shape of a straight tube. Each of the fuel passages P1 and P2 is arranged to project toward the combustion chamber 11. The fuel passages P1 and P2 are joined to the partitions 42 and 43, respectively, through welding, for example. The partition 44 is not provided with such a fuel passage, and the partition 44 serves as an end wall, or lid, of the casing 41 while defining the cavity 45c. Since the plurality of cavities are layered in an axial direction in the present embodiment, each of the fuel passages which connect one of the cavities to the corresponding fuel nozzles is arranged to pass through another one or more of the cavities to be connected to the corresponding fuel nozzles. Specifically, each fuel passage P1 passes through the cavity 45a to connect the cavity 45b to the corresponding fuel nozzles 32b. In addition, each fuel passage P2 passes through the cavities 45a and 45b to connect the cavity 45c to the corresponding fuel nozzles 32c. The cavity 45a is directly connected to the fuel nozzles 32a.

In addition, individual fuel inlets 46a, 46b, and 46c for the cavities 45a, 45b, and 45c, respectively, are provided in the outer circumferential face 41a of the manifold 40. The first fuel line, the second fuel line, and the third fuel line are connected to the fuel inlet 46a, the fuel inlet 46b, and the fuel inlet 46c, respectively. It is possible to independently control, via each fuel line, the supply and stop of supply of the fuel to the cavities 45a to 45c, and to the fuel nozzles 32a to 32c.

Although not depicted in the figures, the separate fuel line is connected to the fuel nozzle 31a. A fuel pipe, not depicted, connected to the fuel nozzle 31a is, for example, arranged to pass through a center of the manifold 40, or inside of the annular cavities 45a to 45c, to be connected to the fuel nozzle 31a.

Advantageous Effects (1) While manifolds, which correspond to the cavities 45a to 45c, are generally formed by independent case-like members, in the present embodiment, an interior of the casing 41 is divided by the partitions 42 to 44 into the cavities 45a to 45c as the manifold spaces arranged in layers. This allows a reduced size of the manifold 40 with improved efficiency in the arrangement of the cavities 45a to 45c, or the manifold spaces, and enables the manifold 40 to be included in the combustor 2 and housed in the casing 4 of the gas turbine 100, i.e., a pressure vessel.

(2) Because the cavities 45a to 45c are arranged on the central axis C of the combustor liner 10 in the central axis extending direction and piping that joins the cavities 45a to 45c and the fuel nozzles 32a to 32c can be made unnecessary or shortened, this leads to a reduced number of parts of piping and simplifying the fuel lines. Shortening of fuel channels reduces a waste heat loss of the fuel, and shortens a time delay that is incurred from the time at which the fuel is distributed from the cavities 45a to 45c to the time at which the fuel is ejected from the fuel nozzles 32a to 32c, leading to an improvement in reliability of the burner 30 at the time of ignition. In addition, because differences between fuel channels from the same cavity to the corresponding fuel nozzles are small, a lack of balance in flow volume of the fuel between the fuel nozzles is limited, which contributes to realizing stable low NOx combustion.

(3) Since the partitions 42 to 44 are inserted in the casing 41, it is easy to change the volumes of the cavities 45a to 45c by changing the axial positions of the partitions 42 to 44.

(4) Since each of the fuel passages P1 and P2, which connects one of the cavities to the corresponding fuel nozzles, passes through another one or more of the cavities, advantageous effects such as an insulation effect for the fuel flowing here, a reduction in a thermal stress due to heat exchange between the fuels, an improvement in heat efficiency due to preheating, and so on can be expected.

(5) The provision of the fuel nozzles 32a to 32c in the end face 41b, which faces the combustion chamber 11, of the casing 41 of the manifold 40 contributes to simplifying the structure, and eliminating or shortening piping for allowing the fuel to feed to the fuel nozzles 32a to 32c. In particular, in the present embodiment, the structure is very simple since each of the fuel nozzles 32a to 32c defines a simple hole provided in the end face 41b of the casing 41.

(6) Since the fuel inlets 46a to 46c for the cavities 45a to 45c, respectively, are provided in the outer circumferential face 41a of the manifold 40, the fuel inlets 46a to 46c are directly joined to the cavities 45a to 45c, respectively. This can contribute to an improvement in piping efficiency.

Second Embodiment

Figure 5:
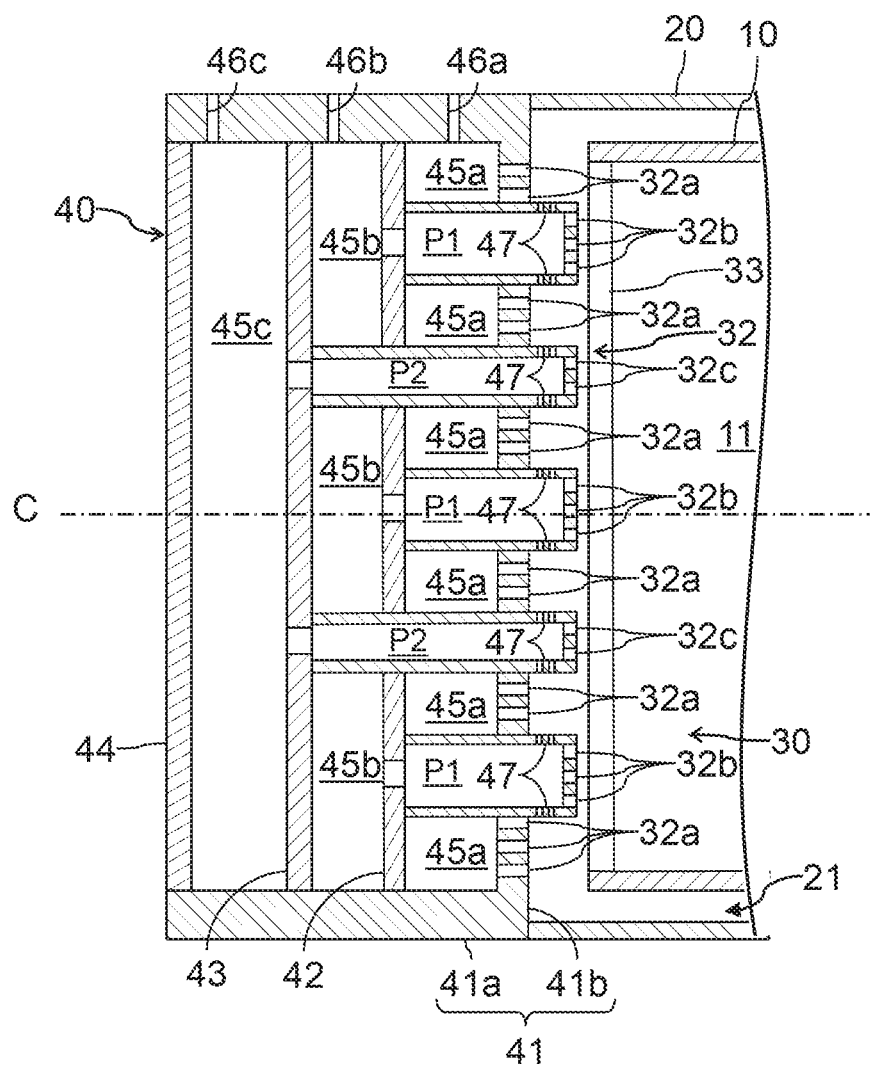
FIG. 5 is a sectional view illustrating the structure of a manifold provided in a combustor according to a second embodiment of the present invention, which corresponds to FIG. 4.

FIG. 5 is a sectional view illustrating the structure of a main part of a combustor according to a second embodiment of the present invention, which corresponds to FIG. 4. In FIG. 5, elements that are identical or correspond to those in the first embodiment are denoted by the same reference symbols as those in the figures already referred to, and descriptions of such elements are omitted.

The present embodiment is different from the first embodiment in that fuel passages P1 and P2 are arranged to pass through an end face 41b of a casing 41, and fuel injection holes 47 are provided in outer circumferential portions of end portions of the fuel passages P1 and P2, which project out of the casing 41. Fuel nozzles 32b and 32c are provided in end faces of the fuel passages P1 and P2, respectively. The fuel injection holes 47 open for the fuel passages P1 and P2 in radial directions of the passages P1 and P2, and a fuel is ejected from each fuel injection hole 47 in a direction perpendicular to a central axis C of a combustor liner 10. The present embodiment is otherwise similar to the first embodiment.

In the present embodiment, advantageous effects similar to those achieved by the first embodiment can be achieved, and, in addition, the addition of the fuel injection holes 47 provides a variety in fuel injection direction, reducing an imbalance in supply of the fuel into premix chambers 32f, which contributes to realizing more stable low NOx combustion.

Third Embodiment

Figure 6:
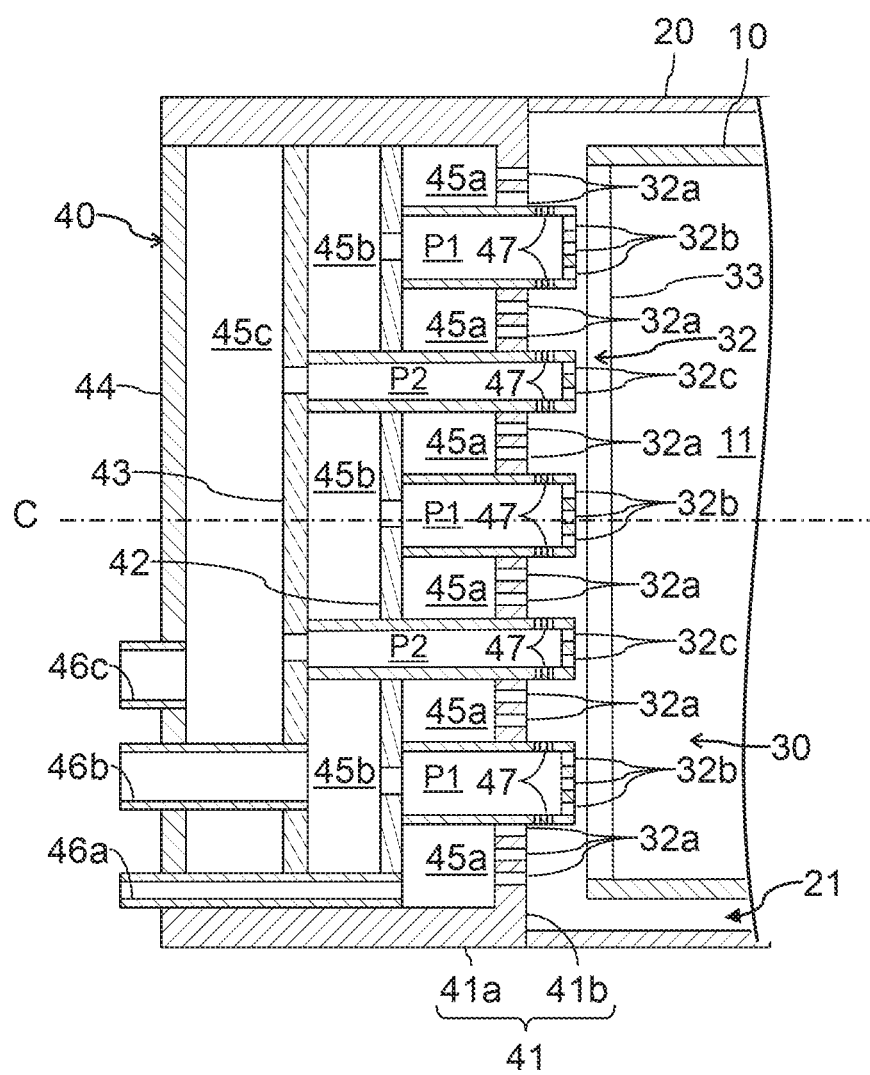
FIG. 6 is a sectional view illustrating the structure of a manifold provided in a combustor according to a third embodiment of the present invention, which corresponds to FIG. 4.

FIG. 6 is a sectional view illustrating the structure of a main part of a combustor according to a third embodiment of the present invention, which corresponds to FIG. 4. In FIG. 6, elements that are identical or correspond to those in the first embodiment are denoted by the same reference symbols as those in the figures already referred to, and descriptions of such elements are omitted.

The present embodiment is different from the first embodiment in that fuel inlets 46a, 46b, and 46c for cavities 45a, 45b, and 45c, respectively, are provided on an end face, or a partition 44 in this example, of a manifold 40 on a side opposite to a side on which a combustion chamber 11 lies. The present embodiment is otherwise similar to the first embodiment.

In the case where a space limitation of a combustor chamber 4a of a casing 4 of a gas turbine 100, for example, makes it difficult to provide an outer circumferential face 41a of the manifold 40 with the fuel inlets 46a to 46c, the positions of the fuel inlets 46a to 46c for the manifold 40 may be changed as appropriate as in the present embodiment. Advantageous effects similar to those achieved by the first embodiment can also be achieved in the present embodiment.

What is claimed is:

1. A multi-stage combustor comprising:
a combustor liner configured to define a combustion chamber therein;
an outer cylinder configured to cover an outer circumference of the combustor liner and to form an annular flow channel that guides a compressed air;
a plurality of fuel nozzles configured to inject a fuel; and
a manifold configured to distribute the fuel to the plurality of fuel nozzles, wherein the manifold is disposed on a central axis of the combustor liner,
the manifold includes a casing that is coupled to the outer cylinder, and a plurality of partitions inserted in the casing so as to be arranged in a direction of the central axis of the combustor liner to define a plurality of cavities divided by the plurality of partitions, and
the plurality of cavities are layered in the direction of the central axis of the combustor liner inside of the casing, and each cavity of the plurality of cavities is connected to corresponding fuel nozzles of the plurality of fuel nozzles,
a fuel passage configured to connect a first cavity of the plurality of cavities to the respective corresponding fuel nozzles, the fuel passage passes through a second cavity of the plurality of cavities, and
an end portion of the fuel passage, the end portion being formed to project out of the casing having an end face which faces the combustion chamber and through which the end portion passes, and the end portion has an outer circumferential portion with a fuel injection hole.

2. The multi-stage combustor according to claim 1, wherein
the end face is provided with at least one fuel nozzle of the plurality of fuel nozzles.

3. The multi-stage combustor according to claim 2, wherein
the at least one fuel nozzle defines a hole provided in the end face.

4. The multi-stage combustor according to claim 1, wherein
the manifold includes an outer circumferential face provided with fuel inlets for the plurality of cavities.

5. The multi-stage combustor according to claim 1, wherein
the manifold includes a second end face provided with fuel inlets for the plurality of cavities, on a second side opposite to a side thereof having the end face facing the combustion chamber.

6. A gas turbine comprising:
a compressor configured to compress an air;
the multi-stage combustor of claim 1, the multi-stage combustor configured to burn a fuel mixed with the air compressed by the compressor to generate a combustion gas; and
a turbine configured to be driven by the combustion gas generated by the multi-stage combustor.

7. A multi-stage combustor comprising:
a combustor liner configured to define a combustion chamber therein;
a plurality of fuel nozzles configured to inject a fuel; and
a manifold configured to distribute the fuel to the plurality of fuel nozzles, wherein the manifold is disposed on a central axis of the combustor liner,
the manifold includes a casing, and a plurality of partitions inserted in the casing so as to be arranged in a direction of the central axis of the combustor liner to define a plurality of cavities divided by the plurality of partitions,
the plurality of cavities are layered in the direction of the central axis of the combustor liner inside of the casing, and each cavity of the plurality of cavities is connected to corresponding fuel nozzles of the plurality of fuel nozzles,
a fuel passage configured to connect a first cavity of the plurality of cavities to the respective corresponding fuel nozzles, the fuel passage passes through a second cavity of the plurality of cavities, and
an end portion of the fuel passage, the end portion being formed to project out of the casing having an end face which faces the combustion chamber and through which the end portion passes, and the end portion has an outer circumferential portion provided with a fuel injection hole.

8. The multi-stage combustor according to claim 7, wherein
the end face is provided with at least one fuel nozzle of the plurality of fuel nozzles.

9. The multi-stage combustor according to claim 8, wherein
the at least one fuel nozzle defines a hole provided in the end face.

10. The multi-stage combustor according to claim 7, wherein
the manifold includes an outer circumferential face provided with fuel inlets for the plurality of cavities.

11. The multi-stage combustor according to claim 7, wherein
the manifold includes a second end face provided with fuel inlets for the plurality of cavities, on a second side opposite to a side thereof having the end face facing the combustion chamber.

12. A gas turbine comprising:
a compressor configured to compress an air;
the multi-stage combustor of claim 7, the multi-stage combustor configured to burn a fuel mixed with the air compressed by the compressor to generate a combustion gas; and
a turbine configured to be driven by the combustion gas generated by the multi-stage combustor.

* * * * *